US011128387B2

United States Patent
Song et al.

(10) Patent No.: US 11,128,387 B2
(45) Date of Patent: Sep. 21, 2021

(54) WIRELESS DATA TRANSMISSION

(71) Applicant: Nokia Solutions and Networks Oy, Espoo (FI)

(72) Inventors: Shen Song, Beijing (CN); Long Chen, Hangzhou (CN); Jianjiang Yang, Hangzhou (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/043,901

(22) PCT Filed: Apr. 8, 2018

(86) PCT No.: PCT/CN2018/082137
§ 371 (c)(1),
(2) Date: Sep. 30, 2020

(87) PCT Pub. No.: WO2019/195956
PCT Pub. Date: Oct. 17, 2019

(65) Prior Publication Data
US 2021/0058165 A1 Feb. 25, 2021

(51) Int. Cl.
*H04B 15/04* (2006.01)
*H04B 1/04* (2006.01)

(52) U.S. Cl.
CPC .......... *H04B 15/04* (2013.01); *H04B 1/0475* (2013.01); *H04B 2001/0425* (2013.01)

(58) Field of Classification Search
CPC .................. H04B 15/04; H04B 1/0475; H04B 2001/0425; H04B 2001/0433; H04B 1/525; H04B 1/62; H03F 1/3241; H03F 1/3247
See application file for complete search history.

(56) References Cited

U.S. PATENT DOCUMENTS 9,306,506 B1 * 4/2016 Zhang .................. H04B 1/0475
10,225,118 B1 * 3/2019 Hagiwara ........... H04L 27/0014
(Continued)

FOREIGN PATENT DOCUMENTS

CN        1593005 A      3/2005
CN     102833012 A    12/2012
(Continued)

OTHER PUBLICATIONS

Oscar Morales Chacón, Ted Johansson and Thomas Flink, The effect of DPD bandwidth limitation on EVM for a 28 nm WLAN 802.11ac transmitter, Linköping University, Catena Wireless Electronics AB, Oct. 23-25, 2017 (Year: 2017).*
(Continued)

*Primary Examiner* — Aristocratis Fotakis
(74) *Attorney, Agent, or Firm* — Harness, Dickey & Pierce, P.L.C.

(57) ABSTRACT

Embodiments of the present disclosure relate to a device, method and computer readable storage medium for wireless data transmission. In example embodiments, the device includes a first NCO configured to shift a frequency of a pre-distorted downlink baseband signal by a first offset to generate a first signal. The baseband signal is associated with a plurality of allocated carriers. The device also includes an RF processing unit including an LO configured to generate an LO signal at an LO frequency. The LO frequency is within a protection area of one of the plurality of allocated carriers or equal to a center frequency of the one of the plurality of allocated carriers. The device also includes a power amplifier configured to generate, based on a modulated baseband signal, an amplified signal for transmission. The device also includes a second NCO configured to shift a frequency of the amplified signal by a second offset (Continued)

to generate a second signal for generation of a pre-distortion coefficient.

15 Claims, 5 Drawing Sheets

(56) References Cited

U.S. PATENT DOCUMENTS

| | | | | |
|---|---|---|---|---|
| 2010/0087227 A1* | 4/2010 | Francos | ............... | H03F 1/3247 455/562.1 |
| 2012/0200355 A1* | 8/2012 | Braithwaite | .......... | H03F 1/3241 330/147 |
| 2013/0107926 A1* | 5/2013 | Xia | ........................... | H03F 3/24 375/224 |
| 2013/0163512 A1* | 6/2013 | Rexberg | ............... | H04B 1/0475 370/328 |
| 2014/0171007 A1* | 6/2014 | Nentwig | ................ | H03D 3/009 455/317 |
| 2015/0049841 A1* | 2/2015 | Laporte | .................... | H03F 1/34 375/297 |
| 2016/0248575 A1* | 8/2016 | Li | .......................... | H04B 1/123 |

FOREIGN PATENT DOCUMENTS

| | | |
|---|---|---|
| CN | 105577601 A | 5/2016 |
| EP | 2528293 A1 | 11/2012 |

OTHER PUBLICATIONS

International Search Report for International Application PCT/CN2018/082137, dated Dec. 14, 2018.

* cited by examiner

WIRELESS DATA TRANSMISSION

This application is a national phase under 35 U.S.C. § 371 of PCT International Application No. CN/2018/082137 which has an International filing date of Apr. 8, 2018, the entire contents of each of which are hereby incorporated by reference.

TECHNICAL FIELD

Embodiments of the present disclosure generally relate to the field of telecommunications, and in particular, to a device, method and computer readable storage medium for wireless data transmission.

BACKGROUND

A network device in a wireless communication system may transmit and receive data for two-way communication. The network device may include a transceiver for data transmission and data reception. For data transmission, the transceiver may modulate a radio frequency (RF) carrier signal with data to generate a modulated RF signal, amplify the modulated RF signal to generate an RF signal having a proper output power level, and transmit the RF signal via an antenna to a terminal device. For data reception, the transceiver may obtain a received RF signal via the antenna and may amplify and process the received RF signal to recover data sent by the terminal device.

A local oscillator (LO) is typically included in the transceiver to generate an LO signal utilized to modulate the RF carrier signal by a modulator. Typically, a portion of the LO signal will leak into an output signal of the transceiver, reducing quality of the output signal and interfering other useful radio signal. The portion of the LO signal that leaks into the output signal of the transceiver is referred to as a LO leakage.

In addition, during amplification of the modulated RF signal, a third-order intermodulation distortion (IMD3) will be caused due to non-linearity of a power amplifier (PA) in the transceiver.

The LO leakage and IMD3 are critical for a wideband system application such as 196 MHz bandwidth. They will both impact the spectrum emission mask (SEM) of the system. Thus, there is a need of solve problems of the LO leakage and IMD3 so as ensure that the transceiver meets the SEM requirement.

SUMMARY

In general, example embodiments of the present disclosure provide a device, method and computer readable storage medium for wireless data transmission.

In a first aspect, a wireless transmitter is provided. The transceiver comprises a first numerically controlled oscillator (NCO) configured to shift a frequency of a pre-distorted downlink baseband signal by a first offset to generate a first signal. The baseband signal is associated with a plurality of allocated carriers. The transceiver also comprises an RF processing unit including an LO configured to generate an LO signal at an LO frequency for modulation of the baseband signal. The LO frequency is within a protection area of one of the plurality of allocated carriers or equal to a center frequency of the one of the plurality of allocated carriers. The transceiver also comprises a power amplifier configured to generate, based on a modulated baseband signal, an amplified signal for transmission. The transceiver also comprises a second NCO configured to shift a frequency of the amplified signal by a second offset to generate a second signal for generation of a pre-distortion coefficient. The second offset is an opposite number of the first offset. The first offset is determined at least based on the LO frequency.

In a second aspect, there is provided a method at a network device. The method comprises determining a frequency within a protection area of one of a plurality of allocated carriers or a center frequency of the one of the plurality of allocated carriers as an LO frequency of an LO. The method also comprises determining a first offset at least based on the LO frequency. A frequency of a pre-distorted signal is to be shifted by a first NCO by the first offset to generate a first signal. The pre-distorted signal is generated by a digital pre-distortion unit based on a downlink baseband signal and a pre-distortion coefficient. The method also comprises determining an opposite number of the first offset as a second offset. A frequency of a demodulated signal is to be shifted by a second NCO by the second offset to generate a second signal. The demodulated signal is generated by a demodulator based on an LO signal at the LO frequency and amplified RF signals from a power amplifier.

In a third aspect, there is provided a computer readable storage medium that stores a computer program thereon. The computer program, when executed by a processor, causes the processor to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
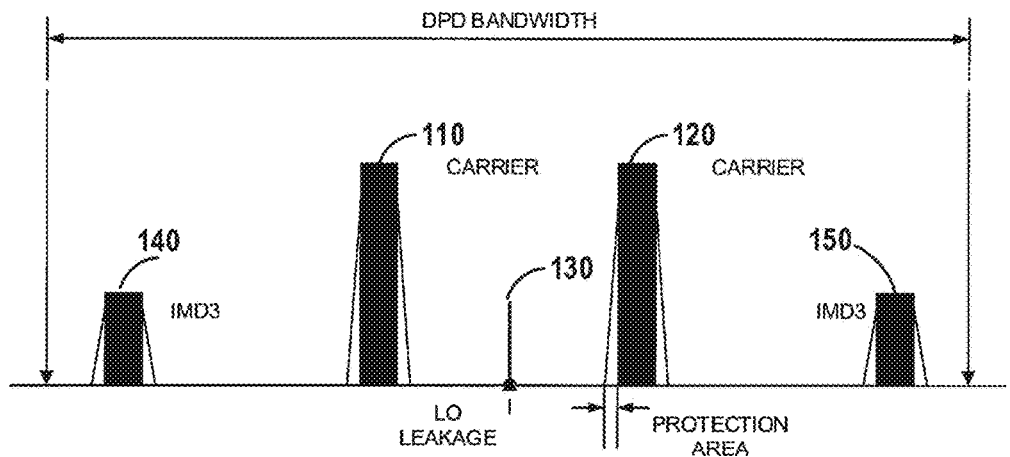
FIG. 1 is a schematic diagram illustrating an example of the LO leakage and IMD 3 in a conventional wireless transceiver.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Currently, a transmitter uses a zero intermediate frequency (ZIF) TRX architecture. In the ZIF TRX architecture, an LO frequency of an LO is fixed and is at a center of an operation bandwidth of the transmitter. Thus, the LO leakage is at the center of the operation bandwidth. In addition, in order to correct the IMD3, a digital pre-distortion (DPD) unit is employed in the transmitter. In the case where the IMD3 falls within a DPD bandwidth of the DPD unit, the IMD3 may be corrected by the DPD unit.

FIG. 1 is a schematic diagram illustrating an example of the LO leakage and IMD 3 in a conventional wireless transceiver. As shown, the transmitter employs a first carrier 110 and a second carrier 120 for transmission of wireless data. An LO leakage 130 is at the center of an operation bandwidth of the transmitter. As such, the LO leakage 130 cannot be corrected by out-of-band filters in the transmitter. In addition, because IMD3 140 and 150 associated with the first carrier 110 and the second carrier 120 fall into a DPD bandwidth of the DPD unit, the IMD3 may be corrected by a DPD unit.

An algorithm for tracking the LO leakage is proposed to suppress the LO leakage to an acceptable level. After the algorithm is used, a power level of the LO leakage is around −15 dBm, which is hard to meet the in-band SEM specification, −15 dBm/@10 MHz offset for no beamforming case, and −24 dBm/@10 MHz offset with eight-antenna beamforming being used. In addition, because just an average value of some sample is used, tracking the LO leakage is not really stable. The LO leakage may vary from −8 dBm to −15 dBm during the real system working. The variation can be caused by temperature, component character, algorithm, interference and so on. Therefore, the power level of the LO leakage obtained by the algorithm cannot meet the SEM requirement.

According to embodiments of the present disclosure, there is proposed a solution for transmission of wireless data. In this solution, an LO frequency of an LO is shifted from the center of the operation bandwidth to a protection area of one of a plurality of allocated carriers. Thus, the in-band useful data will not be affected by an LO leakage. A baseband signal associated with a plurality of allocated carriers is shifted in an opposite offset. In this way, a DPD bandwidth will not be reduced and thus IMD3 associated with the plurality of allocated carriers can be corrected. Principle and implementations of the present disclosure will be described in detail below with reference to FIGS. 2 to 8.

Figure 2:
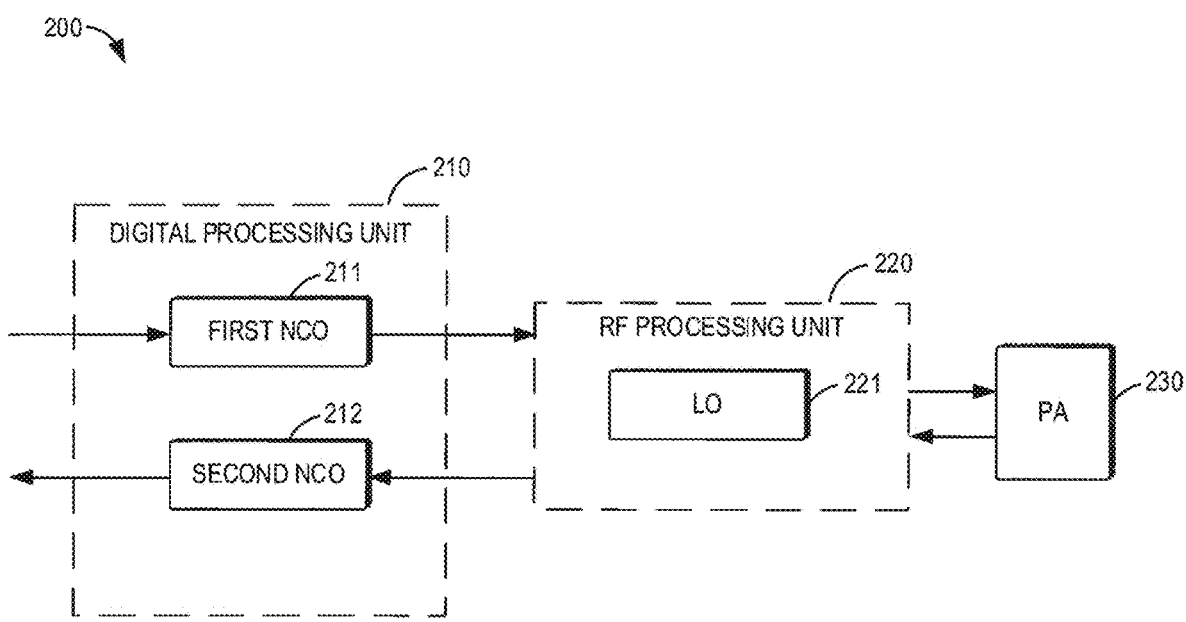
FIG. 2 shows a block diagram of a wireless transceiver in accordance with some embodiments of the present disclosure.

FIG. 2 shows a block diagram of a wireless transceiver 200 in accordance with some embodiments of the present disclosure. The transceiver 200 can be implemented at or as at least a part of a network device. The transceiver 200 includes a digital processing unit 210, an RF processing unit 220 and a PA 230. It is to be understood that the block diagram of FIG. 2 is not intended to indicate that the transceiver 200 is to include all of the components as shown in FIG. 2. Rather, the transceiver 200 can include fewer or additional components not illustrated in FIG. 2 (e.g., additional modules, additional memory systems, additional interfaces, etc.).

The digital processing unit 210 includes a first numerically controlled oscillator (NCO) 211 and a second NCO 212. The first NCO 211 is configured to shift a frequency of a pre-distorted downlink baseband signal by a first offset to generate a first signal. The pre-distorted downlink baseband signal is associated with a plurality of allocated carriers. In some embodiments, the pre-distorted downlink baseband signal may be generated by a DPD unit 216, which will be described below with reference to FIG. 5.

The RF processing unit 220 includes an LO 221. The LO 221 is configured to generate an LO signal at an LO frequency. The LO signal is used for modulation of the baseband signal so as to generate an RF signal. The LO frequency is within a protection area of one of the plurality of allocated carriers or equal to a center frequency of the one of the plurality of allocated carriers. As known, a protection area is located within a bandwidth of an allocated carrier and no useful data will be arranged within the protection area. Thus, the LO leakage within the protection area or at a center frequency of the one of the plurality of allocated carriers will not affect transmission of the useful data.

The PA 230 is configured to generate, based on a modulated baseband signal, an amplified signal for transmission to a terminal device.

The LO frequency may be determined when the carriers are allocated. In some embodiments, a center frequency $F_C$ may be determined and the LO frequency may be determined at least based on the center frequency $F_C$. The center frequency $F_C$ is located at a center of an instantaneous bandwidth of the plurality of allocated carriers. The instantaneous bandwidth is calculated from a lower edge of an allocated carrier having the lowest frequency to a higher edge of an allocated carrier having the highest frequency. Hereinafter, for ease of discussion, the allocated carrier having the lowest frequency is referred to as a lowest carrier and the allocated carrier having the highest frequency is referred to as a highest carrier.

In some embodiments, the center frequency $F_C$ may be determined based on a bandwidth of the lowest carrier, a bandwidth of the highest carrier, a center frequency of the lowest carrier, and a center frequency of the highest carrier. For example, the center frequency $F_C$ may be determined based on the following equation:

$$F_C = \left(F_{C_{low}} - \frac{BW_{C_{low}}}{2}\right) + \frac{\left(F_{C_{high}} + \frac{BW_{C_{high}}}{2}\right) - \left(F_{C_{low}} - \frac{BW_{C_{low}}}{2}\right)}{2} = \frac{\left(F_{C_{low}} - \frac{BW_{C_{low}}}{2}\right) + \left(F_{C_{high}} + \frac{BW_{C_{high}}}{2}\right)}{2} = \frac{F_{C\_low} + F_{C\_high}}{2} + \frac{BW_{C\_high} - BW_{C\_low}}{4} \quad (1)$$

where $BW_{C\_low}$ represents a bandwidth of the lowest carrier, $BW_{C\_high}$ represents a bandwidth of the highest carrier, $F_{C\_low}$ represents a center frequency of the lowest carrier, and $F_{C\_high}$ represents a center frequency of the highest carrier.

In some embodiments, the plurality of allocated carriers may include a first carrier and a second carrier, center frequencies of which are near to the center frequency $F_C$. The first carrier has a center frequency $F_{C\_x}$ and a carrier bandwidth $BW_{C\_x}$. The second carrier has a center frequency $F_{C\_y}$ and a carrier bandwidth $BW_{C\_y}$. It may be assumed that $F_{C\_x}$ is less than $F_{C\_y}$. Then, it is determined which one of the first and second carriers is nearer to the center frequency $F_C$. If it is determined that the first carrier is nearer to the center frequency $F_C$, the LO frequency may be set to be within the protection area of the first carrier. Otherwise, the LO frequency may be set to be within the protection area of the second carrier.

In some embodiments, the LO frequency may have a predetermined offset to the center frequency of the carrier which is nearer to the center frequency $F_C$. The predetermined offset may be equal to or less than a half of the carrier bandwidth.

For example, values of expressions $(F_{C\_x}+BW_{C\_x}*0.45)$ and $(F_{C\_y}-BW_{C\_y}*0.45)$ may be calculated. If $(abs(F_C-(F_{C\_x}+BW_{C\_x}*0.45)) \leq abs(F_C-(F_{C\_y}-BW_{C\_y}*0.45)))$ exists, the LO frequency f_tx_lo may be determined as $F_{C\_x}+(BW_{C\_x}*0.45+0.045$ MHz$)$. Otherwise, the LO frequency f_tx_lo may be determined as $F_{C\_y}-(BW_{C\_y}*0.45+0.045$ MHz$)$.

Upon determining the LO frequency f_tx_lo, the first offset to be used by the first NCO and the second offset to be used by the second NCO may be determined.

In some embodiments, the first offset and the second offset may be determined based on the LO frequency and center frequencies of the allocated carriers. For example, the first offset and the second offset may be determined based on the following equations:

$$F\_dpd\_tx\_nco = F_{C\_low} - BW_{C\_low}/2 + IBW\_alloc/2 - f\_tx\_lo \quad (2)$$

$$F\_parest\_nco = -F\_dpd\_tx\_nco \quad (3)$$

where F_dpd_tx_nco represents the the first offset, F_parest_nco represents the second offset, and IBW_alloc represents the instantaneous bandwidth of the plurality of allocated carriers. IBW_alloc may be determined based on the following equation:

$$IBW\_alloc = F_{C\_high} + (BW_{C\_high}/2) - (F_{C\_low} - (BW_{C\_low}/2)) \quad (4)$$

Figure 3:
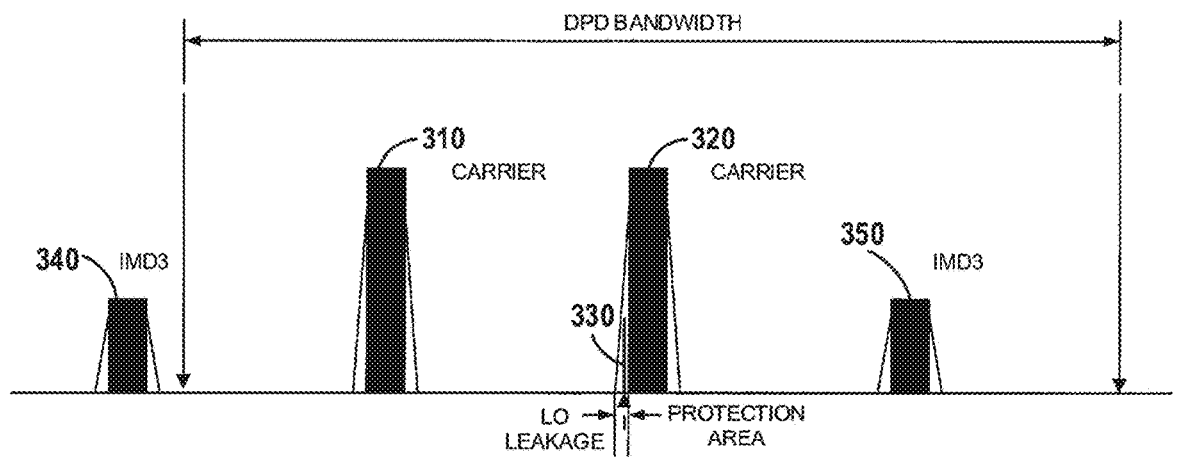
FIG. 3 is a schematic diagram illustrating an example of the LO leakage and IMD 3 when an LO frequency is within a protection area of an allocated carrier.

FIG. 3 is a schematic diagram illustrating an example of the LO leakage and IMD 3 when an LO frequency is within a protection area of an allocated carrier. In this example, the pre-distorted downlink baseband signal is associated with allocated carriers 310 and 320. An LO leakage 330 is within a protection area of the carrier 320. It will be appreciated that the LO leakage 330 within the protection area of the carrier 320 is shown only for the purpose of illustration, without any suggestion of limitations. In other embodiments, the LO leakage 330 may be within a protection area of the carrier 310.

As shown in FIG. 3, there are IMD3 340 and IMD3 350 associated with the first carrier 310 and the second carrier 320. IMD3 350 falls into a DPD bandwidth of the DPD unit. Accordingly, the IMD3 350 may be corrected by the DPD unit. IMD3 340 falls out of the DPD bandwidth. Accordingly, the IMD3 340 cannot be corrected by the DPD unit. In order to cause the IMD3 340 to fall into the DPD bandwidth, the second NCO 212 is included in the digital processing unit 210. The second NCO 212 is configured to shift a frequency of the amplified signal by a second offset to generate a second signal. The second offset is an opposite number of the first offset. The first offset is determined at least based on the LO frequency. The second signal is used for generation of a pre-distortion coefficient, which will be described below with reference to FIG. 5.

Figure 4:
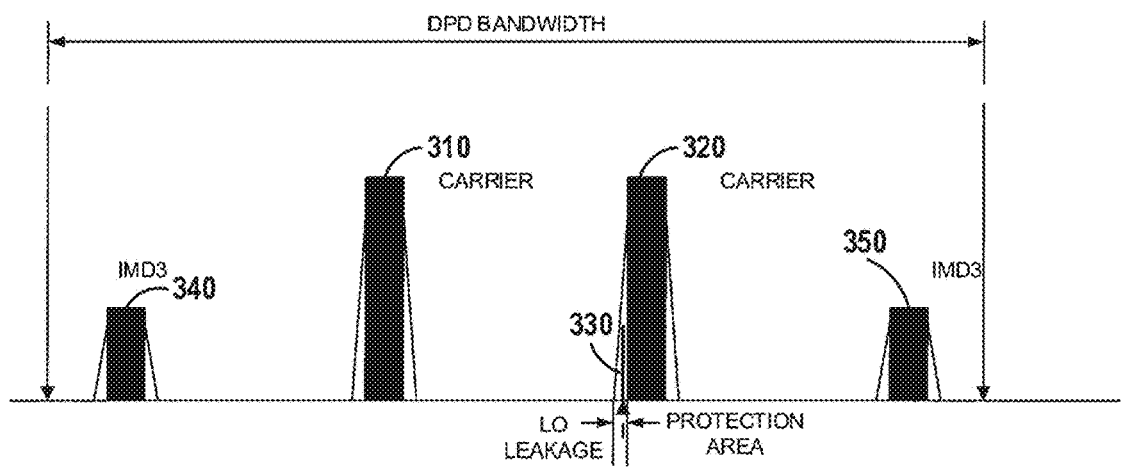
FIG. 4 is a schematic diagram illustrating an example of the LO leakage and IMD 3 in accordance with some embodiments of the present disclosure.

By means of the first NCO 211 and the second NCO 212, the LO leakage 330 is within the protection area of the carrier 320, IMD3 340 and IMD3 350 both fall into the DPD bandwidth, as shown in FIG. 4. Thus, IMD3 340 and IMD3 350 both can be corrected by the DPD unit.

Figure 5:
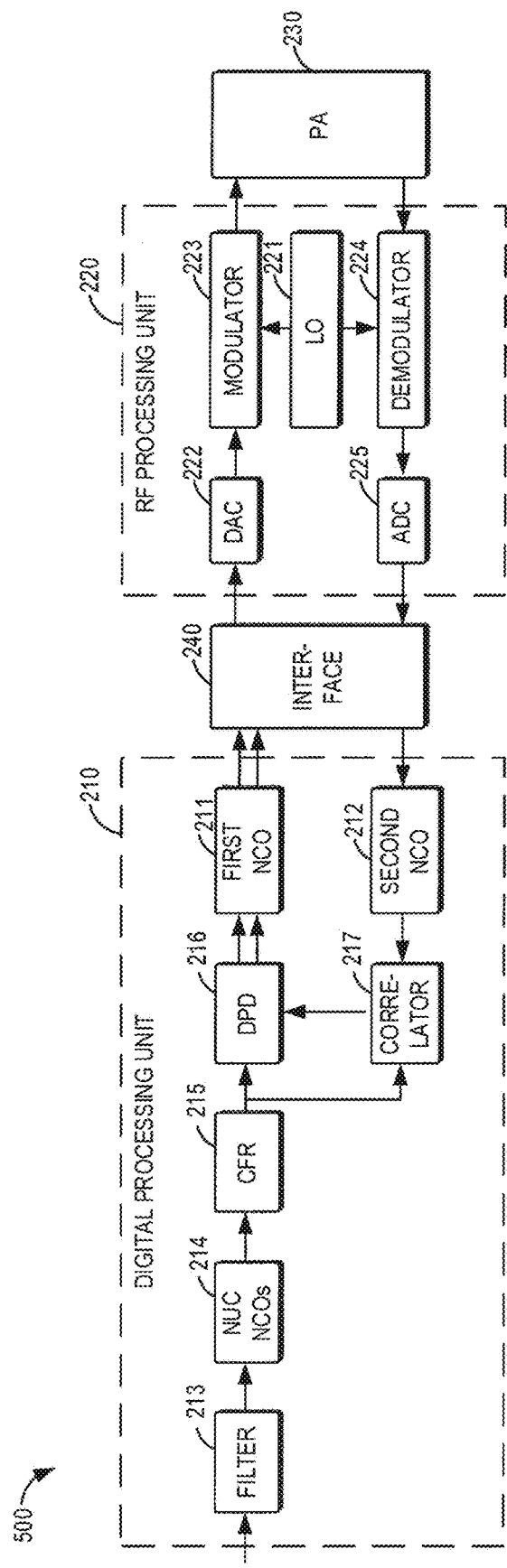
FIG. 5 shows a block diagram of a wireless transceiver in accordance with other embodiments of the present disclosure.

Detailed implementations, arrangements, and operations of the transceiver will be described in the following paragraphs with reference to FIG. 5. FIG. 5 shows a block diagram of a wireless transceiver 500 in accordance with other embodiments of the present disclosure. The transceiver 500 may be considered as a further example implementation of the transceiver 20 as shown in FIG. 2. Accordingly, the transceiver 500 can also be implemented at or as at least a part of a network device. It is to be understood that the block diagram of FIG. 5 is not intended to indicate that the transceiver 500 is to include all of the components as shown in FIG. 5. Rather, the transceiver 500 can include fewer or additional components not illustrated in FIG. 5 (e.g., additional modules, additional memory systems, additional interfaces, etc.).

The transceiver 500 includes the digital processing unit 210, the RF processing unit 220, the PA 230 and an interface 240 between the digital processing unit 210 and the RF processing unit 220.

As shown in FIG. 5, in addition to the first NCO 211 and the second NCO 212, the digital processing unit 210 includes a filter 213, a group of NCOs 214, a crest factor reduction (CFR) unit 215, a DPD unit 216 and a correlator 217.

The filter 213 is configured to generate a filtered signal based on a downlink signal received from a system module (not shown). In some embodiments, the signal received from the system module may have I-data and Q-data components.

The group of NCOs 214 may include a plurality of NCOs. Each of the plurality of NCOs may be associated with one of the allocated carriers. The number of the NCOs in the group 214 is equal to the number of the allocated carriers. Each of the NCOs in the group 214 is configured to perform digital up-conversion (DUC) on the filtered signal to generate a baseband signal associated with a respective one of the allocated carriers. As such, the NCOs in the group 214 are also referred to as DUC NCOs.

Consider the example as shown in FIG. 4. The DUC NCOs may include a first DUC NCO and a second DUC NCO. The first DUC NCO may be configured to perform DUC on the filtered signal to generate a first baseband signal associated with the carrier 310. The second DUC NCO may be configured to perform DUC on the filtered signal to generate a second baseband signal associated with the carrier 320. In some embodiments, the first baseband signal may be time-multiplexed with the second baseband signal so as to generate a multiplexed signal.

In some embodiments, an up-conversion value used by a DUC NCO may be determined based on a center frequency of a carrier associated with the DUC NCO, and the instantaneous bandwidth of the plurality of allocated carriers. For example, the up-conversion value may be determined based on the following equation:

$$F\_duc\_nco\_alloc = Fc\_alloc - (F_{C\_low} - BW_{C\_low}/2 + IBW\_alloc/2) \quad (5)$$

where F_duc_nco_alloc represents an up-conversion value, Fc_alloc represents a center frequency of a carrier associated with the DUC NCO.

The CFR unit 215 is configured to reduce a peak-to-average ratio of the multiplexed signal to generate a baseband signal having a low crest factor.

The DPD unit 216 is configured to intentionally distort the baseband signal in a manner that is inverse to the behavior of the PA 230 so as to obtain linearization of the output signal. For the purpose of distortion, the DPD unit 216 may use a pre-distortion coefficient provided by the correlator 217 and a predetermined pre-distortion algorithm.

The correlator 217 is configured to correlate the signal from the CFR 215 and the signal from the second NCO to generate the pre-distortion coefficient.

The RF processing unit 220 includes a digital-to-analog converter (DAC) 222, a modulator 223, a demodulator 224 and an Analog-to-Digital Converter (ADC) 225, in addition to the LO 221 as described above.

The DAC 222 is configured to perform digital-to-analog conversion on the signal from the digital processing unit 210 to generate an analog baseband signal.

The modulator 223 is configured to modulate the analog baseband signal with the LO signal from the LO 221 to generate RF signals associated with the plurality of allocated carriers based on. For example, the modulator 223 may generate an RF signal associated with the carrier 310 in FIG. 4 and an RF signal associated with the carrier 320.

The demodulator 224 is configured to demodulate the amplified signal from the PA 230 with the LO signal from the LO 221.

The ADC 225 is configured to perform analog-to-digital conversion on the signal from the demodulator 224 to generate a digital baseband signal.

Referring back to FIG. 3, it may be seen that the support operation bandwidth of the transceiver will shrink after the LO frequency is shifted from the center of the operation bandwidth to the protection area. Because the DPD bandwidth is shifted and occupied, the signal will be shifted by an offset to the DPD window.

For example, after the LO frequency f_tx_lo for the allocated carriers are determined, the effective RF bandwidth (i.e., operation bandwidth) for DPD is 200 Mhz in 491.52 MHz DPD rate, the DUC NCOs can only support a frequency range [−100 MHz, 100 MHz], and filters after DUC NCOs are designed with 200 MHz BW. It may be understood that the higher the DPD rate, the higher the operation bandwidth. The effective frequencies of the DUC NCOs should be within [−100+BW_alloc, 100-BW_alloc], where BW_alloc represents the bandwidth of an allocated carrier. To exclude the carrier configuration which will conflict with the DPD bandwidth requirement, a space between a center frequency of each the plurality of allocated carriers and the LO frequency may be equal to or less than a half of an operation bandwidth of the RF transceiver. For example, when a carrier is to be allocated, it may be determined whether the following limitation is met:

$$ABS(Fe\_alloc-f\_tx\_lo) \leq BW\_operation/2-BW\_alloc/2 \quad (6)$$

where Fc_alloc represents a center frequency of the carrier to be allocated, $F_{C\_low} \leq Fc\_alloc \leq F_{C\_high}$, BW_operation represents an operation bandwidth of the transceiver.

It should be noted that the values of the operation bandwidth and the DPD rate are described only for the purpose of illustration and help those skilled in the art to understand idea and principle of the present disclosure, without suggesting any limitations as to the scope of the disclosure. Any appropriate operation bandwidth and DPD rate may be used with the present disclosure.

Figure 6:
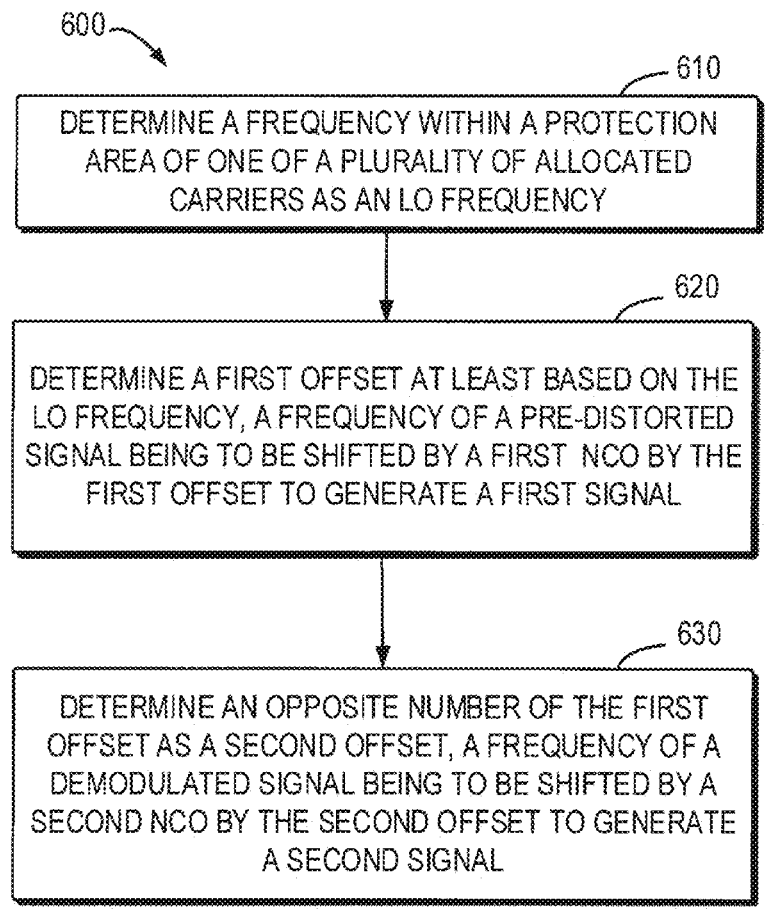
FIG. 6 shows a flowchart of a method in accordance with some embodiments of the present disclosure.

FIG. 6 shows a flowchart of a method 600 in accordance with some embodiments of the present disclosure. The method 600 may be implemented in a network device.

At 610, a frequency within a protection area of one of a plurality of allocated carriers is determined as an LO frequency of an LO.

At 620, a first offset is determined at least based on the LO frequency. A frequency of a pre-distorted signal is to be shifted by a first numerically controlled oscillator, NCO, by the first offset to generate a first signal. The pre-distorted signal is generated by a digital pre-distortion unit based on a downlink baseband signal and a pre-distortion coefficient.

At 630, an opposite number of the first offset is determined as a second offset. A frequency of a demodulated signal being to be shifted by a second NCO by the second offset to generate a second signal. The demodulated signal is generated by a demodulator based on an LO signal at the LO frequency and amplified RF signals from a power amplifier.

In some embodiments, determining the frequency within the protection area comprises: in response to a space between a center frequency of each the plurality of allocated carriers and the LO frequency being equal to or less than a half of an operation bandwidth of the network device, determining the frequency within the protection area.

In some embodiments, the one of the plurality of allocated carriers includes a first carrier having a first center frequency and a carrier bandwidth. The method 600 further comprises: in response to the first center frequency being nearest to a center of an instantaneous bandwidth of the plurality of allocated carriers, determining the first carrier as the one of the plurality of allocated carriers.

In some embodiments, the LO frequency has a predetermined offset to the first center frequency, the predetermined offset being equal to or less than a half of the carrier bandwidth.

In some embodiments, the LO frequency is both within the protection area and within a bandwidth of the digital pre-distortion unit.

Figure 7:
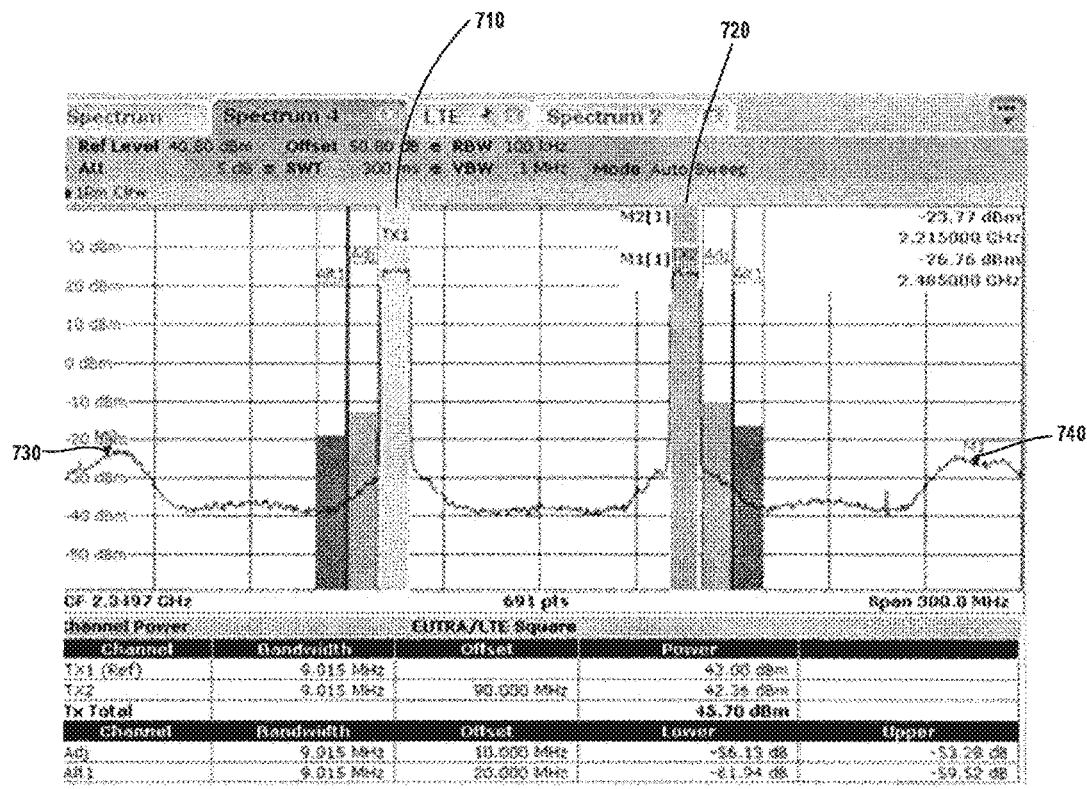
FIG. 7 shows the LO leakage and IMD performance obtained by using the wireless transceiver in accordance with some embodiments of the present disclosure.

FIG. 7 show a simulation result of the transceiver according to some embodiments of the present disclosure. As shown, IMD3 730 and IMD3 740 associated with carriers 710 and 720 are well corrected and LO leakage is invisible, which can meet the SEM requirement.

In some embodiments, an apparatus capable of performing the method 600 may comprise means for performing the respective steps of the method 600. The means may be implemented in any suitable form. For example, the means may be implemented in a circuitry or software module.

In some embodiments, the apparatus comprises: means for determining a frequency within a protection area of one of a plurality of allocated carriers or a center frequency of the one of the plurality of allocated carriers as an LO frequency of an LO; means for determining a first offset at least based on the LO frequency, a frequency of a pre-distorted signal being to be shifted by a first NCO by the first offset to generate a first signal, the pre-distorted signal being generated by a digital pre-distortion unit based on a downlink baseband signal and a pre-distortion coefficient; and means for determining an opposite number of the first offset as a second offset, a frequency of a demodulated signal being to be shifted by a second NCO by the second offset to generate a second signal, the demodulated signal being generated by a demodulator based on an LO signal at the LO frequency and amplified radio frequency, RF, signals from a power amplifier.

In some embodiments, means for determining the frequency within the protection area comprises: means for determining the frequency within the protection area in response to a space between a center frequency of each the plurality of allocated carriers and the LO frequency being equal to or less than a half of an operation bandwidth of the network device.

In some embodiments, the one of the plurality of allocated carriers includes a first carrier having a first center frequency and a carrier bandwidth. The apparatus further comprises: in response to the first center frequency being nearest to a center of an instantaneous bandwidth of the plurality of allocated carriers, determining the first carrier as the one of the plurality of allocated carriers.

In some embodiments, the LO frequency has a predetermined offset to the first center frequency, the predetermined offset being equal to or less than a half of the carrier bandwidth.

In some embodiments, the LO frequency is both within the protection area and within a bandwidth of the digital pre-distortion unit.

Figure 8:
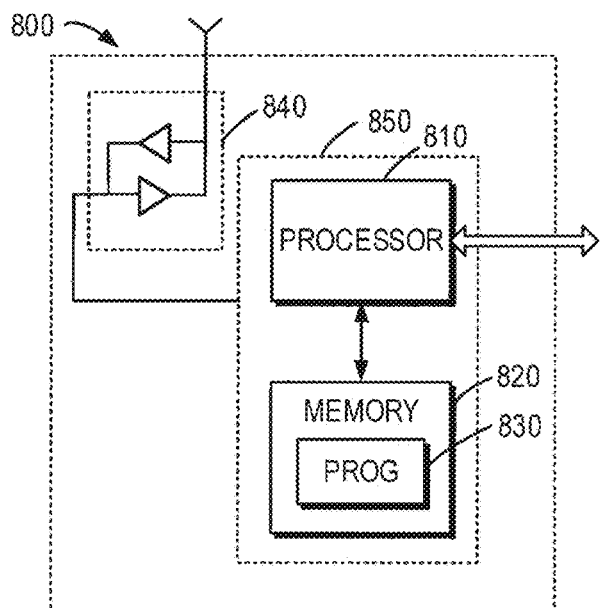
FIG. 8 shows a block diagram of a device suitable for implementing embodiments of the present disclosure.

FIG. 8 is a simplified block diagram of a device 800 that is suitable for implementing embodiments of the present disclosure. The device 800 can be implemented at or as at least a part of a network device.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 820 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 1 to 6. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various example embodiments of the present disclosure may be implemented in hardware, special purpose circuits, software, logic or any combinations thereof. Some aspects may be implemented in hardware while other aspects may be implemented in firmware or software executed by controllers, microprocessors or other computing devices. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device, comprising:
   a first numerically controlled oscillator (NCO) configured to shift a frequency of a pre-distorted downlink baseband signal by a first offset to generate a first signal, the baseband signal being associated with a plurality of allocated carriers;
   a radio frequency processing unit including a local oscillator (LO) configured to generate an LO signal at an LO frequency for modulation of the baseband signal, the LO frequency being within a protection area of one of the plurality of allocated carriers or being equal to a center frequency of the one of the plurality of allocated carriers;
   a power amplifier configured to generate, based on a modulated baseband signal, an amplified signal for transmission; and
   a second NCO configured to shift a frequency of the amplified signal by a second offset to generate a second signal for generation of a pre-distortion coefficient, the second offset being an opposite number of the first offset, the first offset being determined at least based on the LO frequency.

2. The device of claim 1, wherein a space between a center frequency of each the plurality of allocated carriers and the LO frequency is equal to or less than a half of an operation bandwidth of the device.

3. The device of claim 1, wherein the one of the plurality of allocated carriers includes a first carrier having a first center frequency and a carrier bandwidth, the first center frequency being nearest to a center of an instantaneous bandwidth of the plurality of allocated carriers.

4. The device of claim 3, wherein the LO frequency has a third offset to the first center frequency, the third offset being equal to or less than a half of the carrier bandwidth.

5. The device of claim 4, wherein the LO frequency is within a bandwidth of a digital pre-distortion unit.

6. A method, comprising:
   determining a frequency within a protection area of one of a plurality of allocated carriers or a center frequency of the one of the plurality of allocated carriers as a local oscillator (LO) frequency of an LO;
   determining a first offset at least based on the LO frequency, a frequency of a pre-distorted signal to be shifted by a first numerically controlled oscillator (NCO) by the first offset to generate a first signal, the pre-distorted signal being generated based on a downlink baseband signal and a pre-distortion coefficient; and
   determining an opposite number of the first offset as a second offset, a frequency of a demodulated signal to be shifted by a second NCO by the second offset to generate a second signal, the demodulated signal being generated based on an LO signal at the LO frequency and amplified radio frequency signals from a power amplifier.

7. The method of claim 6, wherein the determining the frequency within the protection area comprises:
   in response to a space between a center frequency of each the plurality of allocated carriers and the LO frequency being equal to or less than a half of an operation bandwidth of the network device, determining the frequency within the protection area.

8. The method of claim 6, wherein the one of the plurality of allocated carriers includes a first carrier having a first center frequency and a carrier bandwidth; and
   the method further comprises:
   in response to the first center frequency being nearest to a center of an instantaneous bandwidth of the plurality of allocated carriers, determining the first carrier as the one of the plurality of allocated carriers.

9. The method of claim 8, wherein the LO frequency has a third offset to the first center frequency, the third offset being equal to or less than a half of the carrier bandwidth.

10. The method of claim 9, wherein the LO frequency is both within the protection area and within a bandwidth of a digital pre-distortion unit.

11. An apparatus, comprising:
    at least one processor; and
    at least one memory including computer program code;
    the at least one memory and the computer program code configured to, with the at least one processor, cause the apparatus at least to perform,
    determining a frequency within a protection area of one of a plurality of allocated carriers or a center frequency of the one of the plurality of allocated carriers as a local oscillator (LO) frequency of an LO;
    determining a first offset at least based on the LO frequency, a frequency of a pre-distorted signal being to be shifted by a first numerically controlled oscillator (NCO) by the first offset to generate a first signal, the pre-distorted signal being generated by a digital pre-distortion unit based on a downlink baseband signal and a pre-distortion coefficient; and
    determining an opposite number of the first offset as a second offset, a frequency of a demodulated signal being to be shifted by a second NCO by the second offset to generate a second signal, the demodulated signal being generated by a demodulator based on an LO signal at the LO frequency and amplified radio frequency signals from a power amplifier.

12. The apparatus of claim 11, wherein the at least one memory and the computer program code are configured to, with the at least one processor, cause the apparatus at least to perform:
    in response to a space between a center frequency of each the plurality of allocated carriers and the LO frequency being equal to or less than a half of an operation bandwidth of a network device, determining the frequency within the protection area.

13. The apparatus of claim 11, wherein the one of the plurality of allocated carriers includes a first carrier having a first center frequency and a carrier bandwidth; and
    the at least one memory and the computer program code are configured to, with the at least one processor, cause the apparatus at least to perform:
    in response to the first center frequency being nearest to a center of an instantaneous bandwidth of the plurality of allocated carriers, determining the first carrier as the one of the plurality of allocated carriers.

14. The apparatus of claim 13, wherein the LO frequency has a third offset to the first center frequency, the third offset being equal to or less than a half of the carrier bandwidth.

15. The apparatus of claim 14, wherein the LO frequency is both within the protection area and within a bandwidth of the digital pre-distortion unit.

* * * * *